United States Patent [19]

Karplus

[11] 4,255,973

[45] Mar. 17, 1981

[54] DIGITAL PRESSURE TRANSDUCER FOR USE AT HIGH TEMPERATURES

[75] Inventor: Henry H. B. Karplus, Hinsdale, Ill.

[73] Assignee: The United States of America as represented by the United States Department of Energy, Washington, D.C.

[21] Appl. No.: 92,154

[22] Filed: Nov. 7, 1979

[51] Int. Cl.³ .............................................. G01L 9/00
[52] U.S. Cl. ...................................... 73/704; 73/728; 73/DIG. 1
[58] Field of Search .................. 73/704, DIG. 1, 722, 73/728, 729, 517 AV

[56] References Cited

U.S. PATENT DOCUMENTS

| | | | |
|---|---|---|---|
| 2,447,817 | 8/1948 | Rieber | 73/704 |
| 2,959,965 | 11/1960 | Holmes | 73/704 |
| 3,067,615 | 12/1962 | Holmes | 73/704 |
| 3,079,800 | 3/1963 | Hoar | 73/704 |
| 4,165,651 | 8/1979 | Olsen | 73/704 |

*Primary Examiner*—Donald O. Woodiel
*Attorney, Agent, or Firm*—Donald P. Reynolds; Frank H. Jackson; Richard G. Besha

[57] ABSTRACT

A digital pressure sensor for measuring fluid pressures at relatively high temperatures includes an electrically conducting fiber coupled to the fluid by a force disc that causes tension in the fiber to be a function of fluid pressure. The tension causes changes in the mechanical resonant frequency of the fiber, which is caused to vibrate in a magnetic field to produce an electrical signal from a positive-feedback amplifier at the resonant frequency. A count of this frequency provides a measure of the fluid pressure.

4 Claims, 3 Drawing Figures

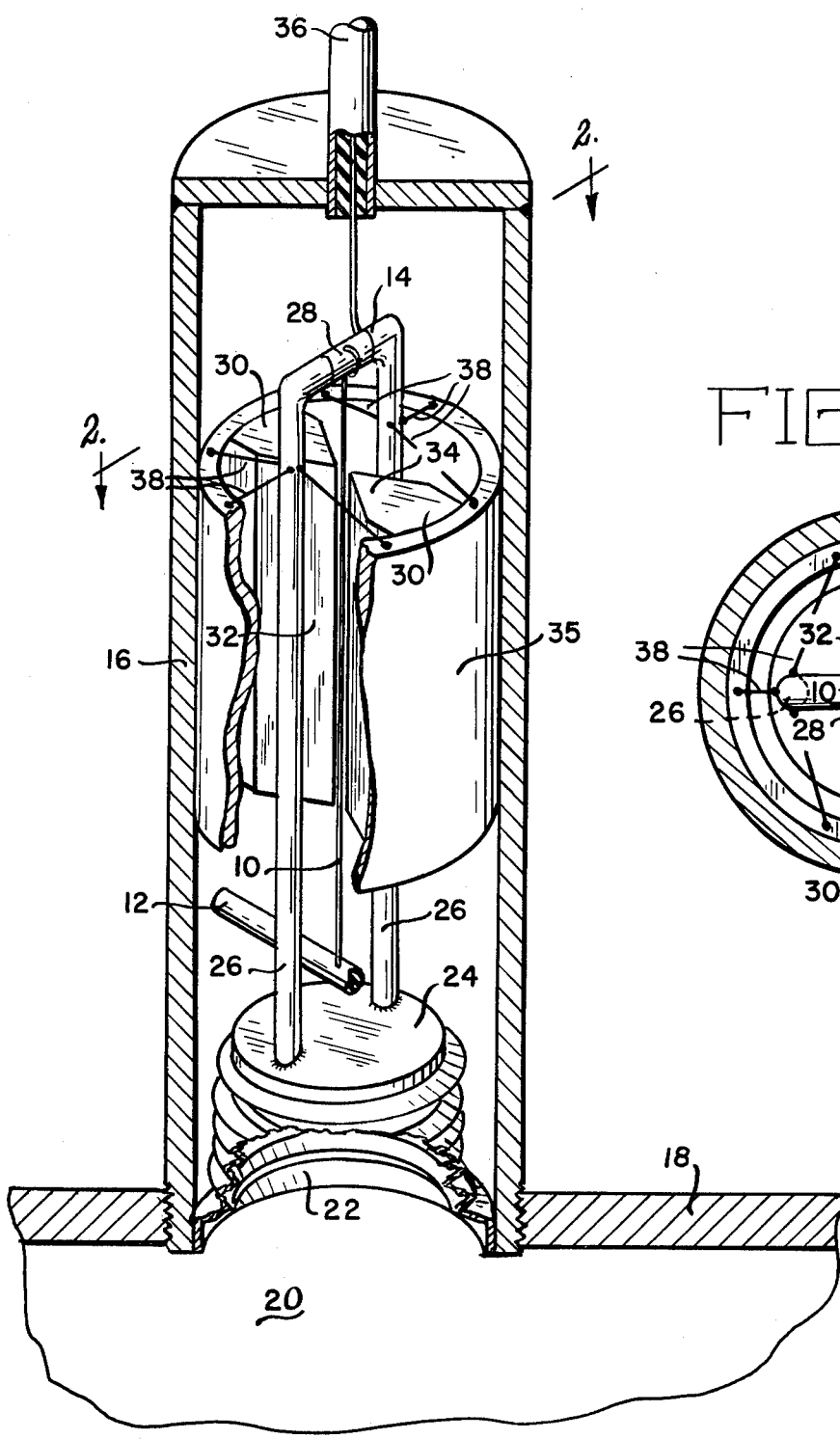
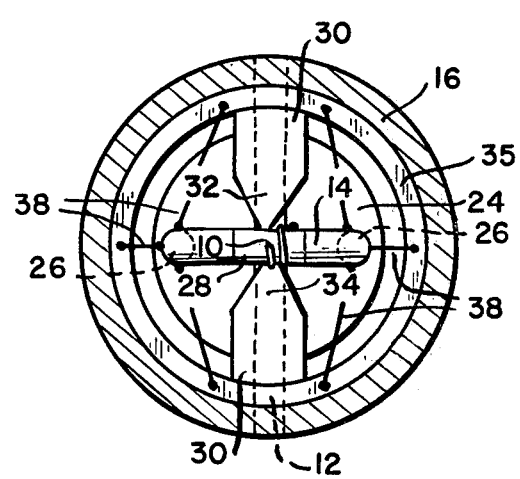

DIGITAL PRESSURE TRANSDUCER FOR USE AT HIGH TEMPERATURES

CONTRACTUAL ORIGIN OF THE INVENTION

The invention described herein was made in the course of, or under, a contract with the UNITED STATES DEPARTMENT OF ENERGY.

BACKGROUND OF THE INVENTION

This invention relates to the measurement of pressure in fluids at relatively high temperatures.

It is frequently important to measure the pressure in a fluid that is in a region of relatively high temperature. Many types of apparatus are used to make such measurements, including manometers of various types, diaphragms, bellows and bourdon tubes. The foregoing elements are mechanical. Electrical pressure-measuring devices include piezoelectric crystals and devices which vary the capacitance of a capacitor as a function of pressure. All of the elements listed above have been used at various times and places to measure pressure. All suffer from various deficiencies when they are applied to measure the pressure in liquids that are at elevated temperatures and especially to liquid metals such as heated sodium and NaK (a mixture of sodium and potassium). Each of these liquid metals has been proposed for use in liquid-metal fast-breeder reactors. The possible presence of radioactivity in such reactors places additional requirements on the pressure sensors to be used.

Any sensor that is used to measure pressure in a liquid at a relatively high temperature must provide a reading that is either independent of the temperature or that can be corrected for temperature effects. Such a sensor must be reliable and it must be capable of calibration after it has been installed. A pressure sensor should provide an indication of pressure that is usable at a location remote from the measuring point and the delivery of information from the point of measurement to the point of use must not be disrupted by electrical noise or other interference.

One solution to the problem of measuring pressure in liquids is given in U.S. Pat. No. 4,103,555, entitled "Pressure Sensor for High-Temperature Liquids." Related solutions are given in U.S. Pat. No. 3,067,614, entitled "Apparatus for Indicating Pressure in Fluids System," and U.S. Pat. No. 2,883,995, "Pressure Transmitter for Liquid Metal System." The devices disclosed in all of these patents detect pressure by exposing a diaphragm to the system and measuring displacement of the diaphragm by some means. In the '555 patent the displacement effects a change in the capacitance of a capacitor, which change is measured by a capacitance bridge to provide a measure of the pressure. The '614 patent operates by detecting the variation of the inductance of an inductor as a core is caused to change its position in response to the movement of a diaphragm under pressure. The '995 patent restores the position of a diaphragm by applying an opposing pressure that is a function of the pressure to be measured.

Common to the systems described above is the use of a diaphragm or bellows that provides a pressure-measuring surface in contact with the fluid to be measured and a means of measuring motion of the diaphragm or bellows. In the '955 patent the availablity of a remote indication of pressure is a function of the passage of pressure lines to the remote location. The '614 and '555 patents make bridge measurements of displacement and the bridge outputs must be taken to remote locations for use. The pressure measurements, whether of electrical properties or a balancing pressure, will be analog in nature and hence will be more susceptible to disruption by electrical or other noise than would be a digital indication.

It is an object of the present invention to provide a better sensor of pressure in fluids at high temperatures.

It is a further object of the present invention to provide a digital pressure transducer for use in fluids at high temperatures.

Other objects will become apparent in the course of a detailed description of the invention.

SUMMARY OF THE INVENTION

A digital pressure transducer comprises an electrically conducting fiber that is supported at one end by a fixed support and at the other end by a support that is coupled through a bellows to a region in which it is desired to measure pressure. A magnet creates a magnetic field in a region about the fiber. With construction constants chosen so that the tension in the fiber is a known function of pressure in the fluid to be measured, the natural frequency of oscillation of the fiber is a function of the pressure. This natural frequency is detected by connecting the fiber electrically to a positive-feedback amplifier that produces oscillations at the resonant frequency of the fiber. These oscillations are detected and counted to provide a digital signal that is a measure of the pressure in the fluid.

BRIEF DESCRIPTION OF THE DRAWINGS

FIG. 1 is a partial sectional perspective view of an apparatus for the practice of the present invention;

FIG. 2 is a sectional view of the apparatus of FIG. 1 taken along section lines 2—2.

DETAILED DESCRIPTION OF THE INVENTION

Figure 3:
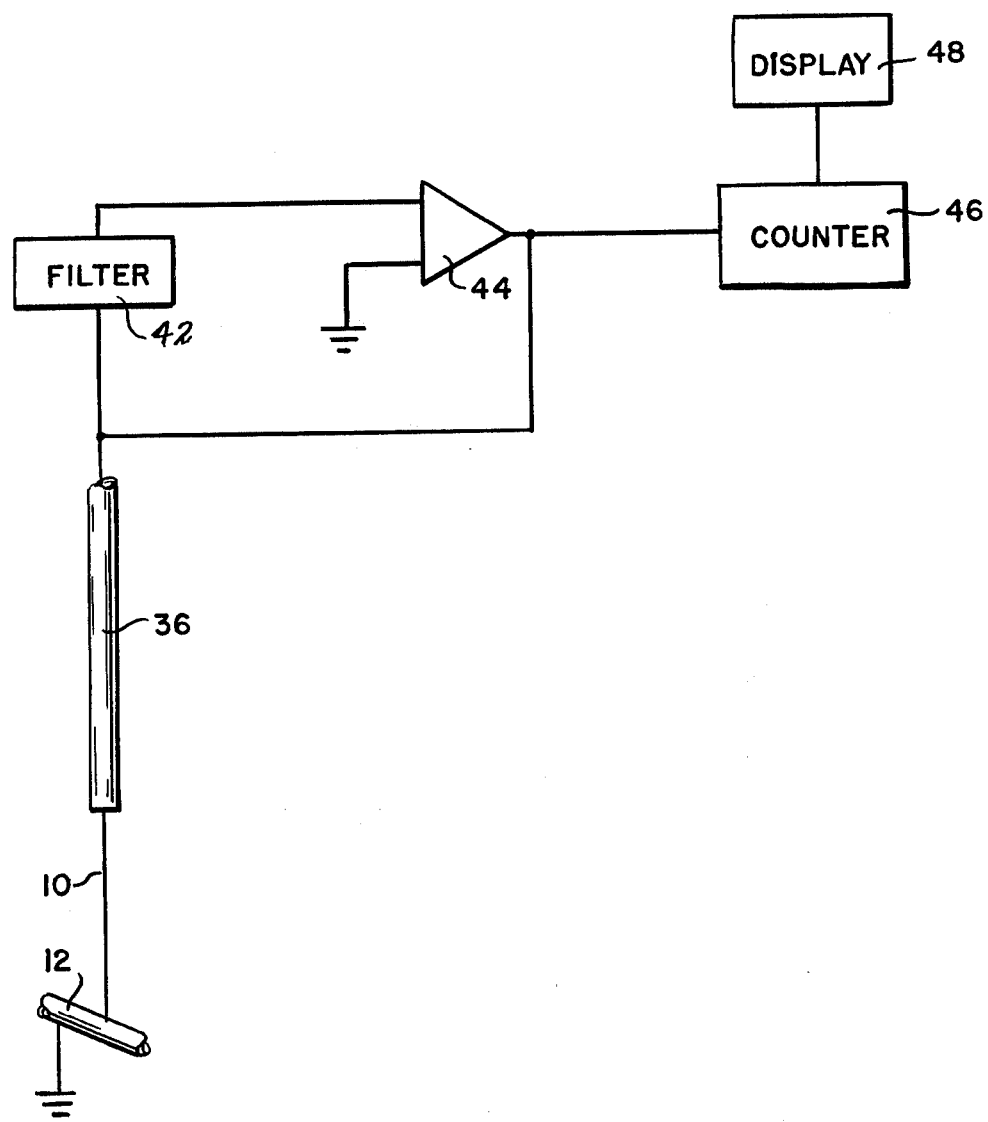
FIG. 3 is a block diagram of an electronic circuit connected to the apparatus of FIGS. 1 and 2 for the practice of the present invention.

FIG. 1 is a partial sectional perspective view of an apparatus for the practice of the present invention and FIG. 2 is a sectional view of the apparatus of FIG. 1, taken along section lines 2—2. In FIGS. 1 and 2, an electrically conducting fiber 10 is suspended between a first support 12 and a second support 14. Fiber 10 may be made of graphite or of a temperature-stable insulator such as quartz that is coated with metal to provide a conducting surface. First support 12 is attached to a housing 16 that is connected by threads or the like to a pipe 18 or similar container of a fluid 20 in which pressure is to be measured. A bellows 22 provides a movable mechanical coupling with fluid 20 while sealing the inside of housing 16 against entry of fluid 20. Bellows 22 includes a force disk 24 that supports a pair of posts 26 that are connected to second support 14. First support 12 is an electrical conductor that places an electrical ground at one end of fiber 10. Second support 14 includes an insulator 28 that both supports and insulates one end of fiber 10.

Over most of its length fiber 10 is disposed perpendicular to a magnetic field that is generated by magnet 30. This is magnet having pole pieces with a north pole 32 and a south pole 34 and a yoke 35 that concentrate the magnetic field to increase its strength in the region of fiber 10. The portion of fiber 10 that projects beyond second support 14 is connected to a coaxial cable 36 that both supplies excitation and detects the results of that excitation. Magnets 30 are here shown as permanent magnets, but is is evident that they could as well be electromagnets. Yoke 30 also provides points of attachment for wires 38 which hold uprights 26 to keep fiber 10 between poles 32 and 34. Other stops to limit travel of force disk 24 and to protect fiber 10 are omitted to improve clarity.

FIG. 3 is a block diagram of a circuit that is connected to fiber 10 of FIGS. 1 and 2 to excite and detect a signal proportional to pressure. In FIG. 3, fiber 10 is shown as connected at one end to first support 12 which is at electrical ground. Fiber 10 is connected at the other end to coaxial cable 36 and thence through filter 42 to operational amplifier 44 which is connected in a positive-feedback configuration. Filter 42 will suppress harmonics generated by the excitation from operational amplifier 44 of vibration at a resonant frequency of fiber 10. Another way to say this is to describe fiber 10 as the oscillating element determining the resonant frequency of an oscillator formed by fiber 10 and the feedback amplifier 44. The output of feedback amplifier 44 is an a-c signal at the mechanical resonant frequency of fiber 10, produced by the generator action of moving the conductor perpendicular to a magnetic field. The a-c signal is connected electrically to counter 46 where it is converted into a digital signal for display in visual display unit 48. If it is desired to apply further signal conditioning or processing to eliminate the effects of noise or for any other reason, such conditioning is applied most readily to the digital output of counter 46. Since pressure is here converted directly to frequency, there is no analog signal conditioning.

It is well known that the resonant frequency of a fiber under tension is given by the expression $$f = \frac{1}{2\pi L} \sqrt{\frac{T}{m}}$$

where f is the frequency of oscillation, L is the length of the fiber, T is the force on the fiber, m is the mass per unit length of the fiber and the units are chosen to be consistent. The tension T in the fiber is given by the expression $$T = PS + T_0$$

where P is the pressure in the fluid, S is the effective area ($\pi D^2/4$) for transmission of force through the bellows and $T_0$ is the prestress applied by the bellows 22 and support 38 or, in other words, the tension in the fiber 10 of FIG. 1 when no external pressure is applied by the fluid. Combining the two expressions and defining $f_0$ as the oscillating frequency when the pressure is zero, that frequency thus corresponding to tension $T_0$, it follows that the pressure, P:

$$P = 16\pi \frac{mL^2}{D^2} (f^2 - f_0^2) = \frac{16\pi ML}{D^2} (f^2 - f_0^2),$$

where M is the total mass of the fiber and D is the effective diaphagm of the bellows.

In use, it will be desirable from time to time to calibrate by measuring the resonant frequency $f_0$ of the wire when the bellows is subjected to any known pressure, as for example atmospheric pressure. Other quantities and the expression for pressure are seen to be constant so that the pressure as determined is a function of the square of the resonant frequency. It is also worth noting that effects of thermal expansion of the fiber length L and diameter D of the diaphragm tend to cancel. Exact cancellation can be achieved if the expansion coefficient of diameter D is one-half the coefficient of the fiber.

The embodiments of the invention in which an exclusive property or privilege is claimed are defined as follows:

1. An apparatus for providing a digital indication of a fluid pressure in a container comprising:
   a fiber;
   means for varying tension in the fiber in response to the fluid pressure;
   means for exciting vibrations in the fiber at a mechanical resonant frequency of the fiber, including means for generating a magnetic field having a component perpendicular to the fiber, a coaxial cable having a center conductor connected electrically to the fiber, and a positive-feedback amplifier including a filter, said positive-feedback amplifier connected electrically to the center conductor to form with the fiber, an oscillator at a resonant frequency of the fiber, said filter connected to the center conductor of the coaxial cable for removing harmonics of the resonant frequency of the fiber from an input to said positive feedback amplifier; and
   means for counting and displaying the resonant frequency, which displayed count is a digital indication of the fluid pressure.

2. The apparatus of claim 1 wherein the fiber is made of graphite.

3. The apparatus of claim 1 wherein the fiber is quartz covered with an electrically conducting metal.

4. An apparatus for providing a digital indication of a fluid pressure in a container comprising:
   a fiber;
   a movable force disk connected to the container and placed in contact with the fluid in the container so as to move in response to the fluid pressure;
   a first support located adjacent said movable force disk connected to a first end of said fiber;
   a second support member mounted on said movable force disk connected to a second end of said fiber at a point remote from said removable force disk, such that said first support member is interposed between said second support member and said movable force disk, so as to maintain said fiber in tension and to increase that tension as pressure on said movable force disk is increased;
   means for exciting vibrations in the fiber at a mechanical resonant frequency of the fiber; and
   means for counting and displaying the resonant frequency, which displayed count is a digital indication of the fluid pressure.

* * * * *